Dec. 4, 1934. H. J. KEITEL 1,983,231
FLUID METER
Filed Oct. 15, 1930
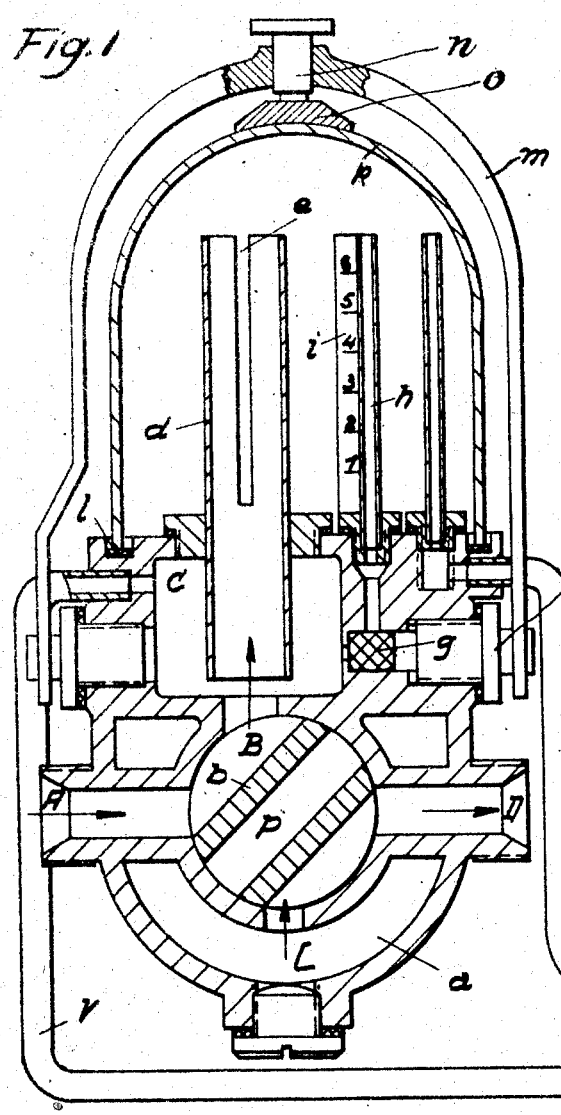
Fig.1
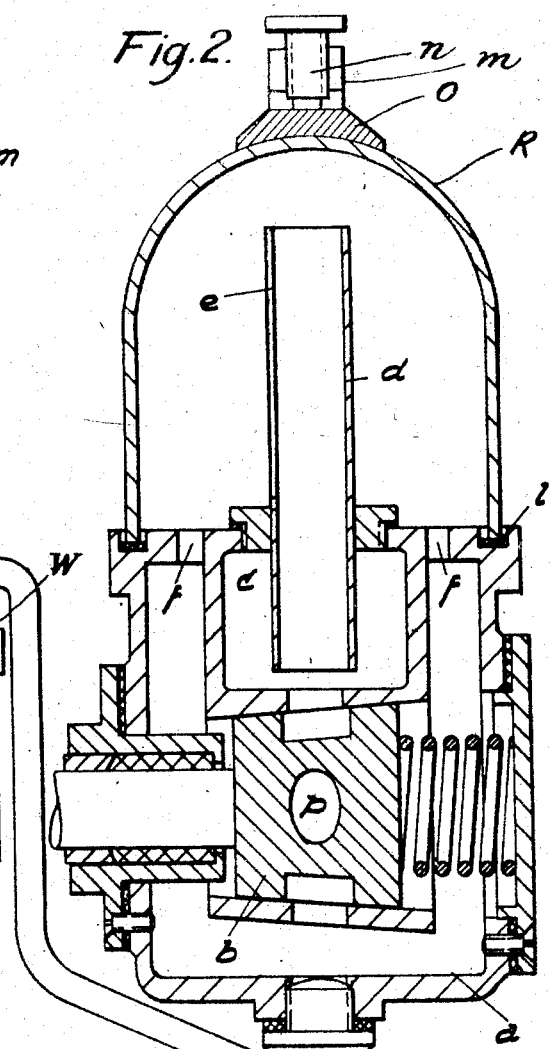
Fig.2
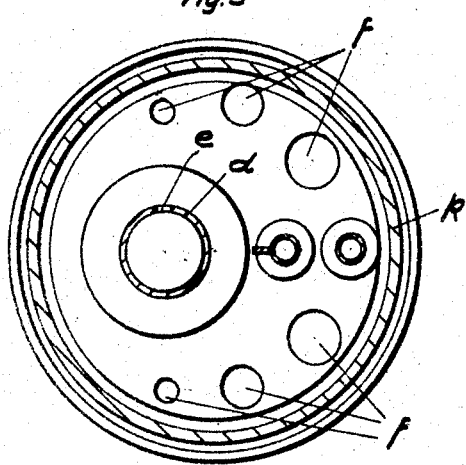
Fig.3
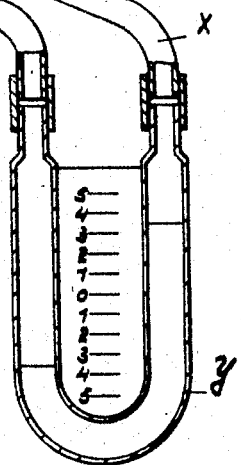
Inventor:
Hans Julius Keitel Patented Dec. 4, 1934

1,983,231

UNITED STATES PATENT OFFICE 1,983,231

FLUID METER

Hans Julius Keitel, Friedrichshafen, Germany

Application October 15, 1930, Serial No. 488,880
In Germany September 16, 1929

3 Claims. (Cl. 73—167)

An application has been filed in Germany September 16, 1929.

The invention relates to a device for measuring the amount of liquid flowing through pipe systems during fixed units of time. It may be used for stationary plants as well as for those connected with vehicles traveling ashore, by water, or by air.

The principal distinction between the present invention and similar ones already previously known is that, in order to effect the steadying of the column of liquid in the rising pipe, an air chamber is built-in before the latter and forms an air cushion which assists the reading in the case of liquids flowing intermittently through the instrument and that the height of the liquid is not read off at or in the rising pipe, but elsewhere. Several different modes of applying the principle of the invention have been provided for, so that the reading may either take place in the device itself or at some spot more or less distant from it.

The simplest design consists in the provision of an inspection tube within the device. This tube is connected to the space in the air chamber containing the liquid. The air chamber ensures that the liquid stands perfectly steady both in the rising pipe and in the inspection tube which is particularly important in the case of intermittent flow through the instrument for example when a pump acts on the liquid column considerably agitating the liquid rising in the rising pipe and the inspection tube connected in parallel thereto. Consequently the amount of flow may be read off from a suitable scale with great accuracy. Colorless liquids may be rendered more easily visible in the inspection tube by fitting a color stencil in front of the latter.

As the pressure in the air chamber is proportionate to the level of the column of liquid in the rising pipe, the amount of liquid flowing through the piping per unit of time may be calculated by ascertaining the difference in the pressure within the air chamber and that underneath the bell covering the rising pipe.

This method of measuring the quantity of liquid is used whenever the reading-off is to be effected at some distance from the appliance itself.

A second method of distant reading consists in measuring, by means of a pressure gauge, the difference between the pressure in the space underneath the bell surmounting the rising pipe and the pressure at some definite spot in the rising pipe below the discharge opening.

Figures 1, 2 and 3 illustrate a measuring device constructed according to the invention herein described and intended to be mainly used as a testing-station apparatus. The actual amount of flow is measured in an inspection tube which is connected to that part of the air chamber which contains the liquid. The liquid, upon entering the rising pipe, is already colored owing to the provision of the color stencil fitted in front of the rising pipe. Figs. 1 and 2 represent vertical sections cut at right angles to one another, whilst Fig. 3 represents a top view of the lower portion of the device after removing the bell surmounting the rising pipe. The liquid which is to be measured enters the casing $a$ at A and—when the cock plug $b$ occupies the position indicated in the drawing—it enters the air chamber $c$ at B. From there it rises in the rising pipe $d$, leaving by the opening $e$ extending longitudinally of pipe $d$. It then flows through the apertures $f$ shown in Fig. 3, thus returning to the interior of the casing $a$. It collects in its lower portion, enters the cock casing—when the cock plug occupies the position indicated—at C and leaves the device at D. At the pressure prevailing in the air chamber $c$ a small part of the liquid enters—in conformity with the law of communicating vessels—the color stencil $g$ and then the sight glass $h$. The height of the column of liquid—and therefore also the amount of flow per unit of time—may be read off at the scale $i$. The rising pipe $d$ and the inspection tube together with the scale arrangement are covered by the bell $k$. The latter rests on a packing ring $l$ and is fitted tight to its seat in the usual manner by means of the clip $m$ with pressure screw $n$ and washer $o$.

If the device has been damaged or if the rising pipe $d$ has to be interchanged, the plug $b$ is turned at an angle of 45 degrees to the right, as seen in Fig. 1. The liquid is then able to flow direct from A to D through the borehole $p$, whereas the measuring device is completely disconnected. If the quantity of flow has to be determined by the difference in the pressure above and below the rising pipe in addition to its being measured at the inspection tube $h$ with the scale $i$, thin tubes $v$ and $x$ are connected to some kind of indicating device, such as for example the U-shaped tube $y$ which is filled with some liquid such as necessary, spirit of wine or water. The quantity of flow can then be directly read off, on the device which is gauged.

An aperture with removable screw plug $w$ is provided in the extension of the stencil $g$. A conduit may be connected to this extension and leads to a pressure difference measuring instrument, for example to one arm of the U-shaped tube, the other arm of which communicates with the air chamber of the casing. Any equivalent type of pressure gauge may be substituted for the U-tube $y$.

What I claim to be new is:

1. A device for measuring the quantity of liquid flowing through a pipe line in a certain unit of time comprising in combination with the pipe-line, a casing connected up in said pipeline, an air chamber in said casing having a liquid and an air compartment, a cock in said casing adapted to direct the flow of liquid from said pipeline to the liquid compartment of said air chamber, a rising pipe extending vertically from the liquid compartment of said air chamber and having an aperture in its side, and an inspection tube also extending from said air chamber and adapted to indicate the quantity of liquid flowing through the aperture in said rising pipe, and a bell on said casing covering said rising pipe and said inspection tube, the air compartment of said air chamber forming an air cushion in front of said rising pipe adapted to prevent fluctuation of the column of liquid in said rising pipe and in said inspection tube.

2. A device as specified in claim 1, in which a stencil is provided between said air chamber and said inspection tube and adapted to colour the liquid passing into said tube.

3. A device for measuring the quantity of liquid flowing through a pipe line in a certain unit of time, comprising in combination with the pipe line, a casing connected up in said pipe line, an air chamber in said casing having a liquid and an air compartment, a cock in said casing adapted to direct the flow of liquid from said pipe line to the liquid compartment of said air chamber, a rising pipe extending vertically from the liquid compartment of said air chamber and having an aperture at its upper end, a bell on said casing forming an air space, and a pressure gauge connected up to said air compartment and said bell adapted to measure the differences in pressure in the air compartment of said air chamber and in the air space under said bell.

HANS JULIUS KEITEL.